United States Patent
Nagata et al.

(10) Patent No.: US 9,104,259 B2
(45) Date of Patent: Aug. 11, 2015

(54) LIQUID CRYSTAL DISPLAY DEVICE WITH TOUCH PANEL

(71) Applicant: Japan Display Inc., Tokyo (JP)

(72) Inventors: Koji Nagata, Hachioji (JP); Toshimitsu Matsudo, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 123 days.

(21) Appl. No.: 13/758,312

(22) Filed: Feb. 4, 2013

(65) Prior Publication Data

US 2013/0207914 A1 Aug. 15, 2013

(30) Foreign Application Priority Data

Feb. 9, 2012 (JP) ................................. 2012-025985

(51) Int. Cl.
*G06F 3/041* (2006.01)
*G06F 3/044* (2006.01)

(52) U.S. Cl.
CPC .............. *G06F 3/0412* (2013.01); *G06F 3/044* (2013.01)

(58) Field of Classification Search
USPC ............. 345/104.173–178; 178/18.01–18.09, 178/18.11
See application file for complete search history.

(56) References Cited

U.S. PATENT DOCUMENTS

| 2009/0225257 A1* | 9/2009 | Sugiyama et al. ............. 349/96 |
| 2009/0284703 A1* | 11/2009 | Shoraku et al. ............. 349/129 |
| 2010/0182273 A1 | 7/2010 | Noguchi et al. |
| 2013/0063404 A1* | 3/2013 | Jamshidi Roudbari et al. ............. 345/204 |

FOREIGN PATENT DOCUMENTS

JP 2009-244958 10/2009

\* cited by examiner

*Primary Examiner* — Charles V Hicks
*Assistant Examiner* — Jeffrey S Steinberg
(74) *Attorney, Agent, or Firm* — Lowe Hauptman & Ham, LLP

(57) ABSTRACT

A liquid crystal display device with a touch panel includes: pixel electrodes which is applied a electrical potential corresponding to a gradation value in respective pixels; common electrodes that are a plurality of electrodes which extend in one direction; a liquid crystal layer having a liquid crystal composition whose orientation is changed according to an electric field developed by the pixel electrodes and the common electrodes; and detection electrodes that are a plurality of electrodes which extend in another direction different from the one direction, and detect a touch position on the panel. The common electrodes include a first electrode which is applied a detection potential for detecting the touch position on the panel, and a second electrode to which a potential different from the detection potential is applied during a period in which the detection potential is applied.

4 Claims, 13 Drawing Sheets

LIQUID CRYSTAL DISPLAY DEVICE WITH TOUCH PANEL

CROSS-REFERENCE TO RELATED APPLICATION

The present application claims priority from Japanese application JP2012-025985 filed on Feb. 9, 2012, the content of which is hereby incorporated by reference into this application.

BACKGROUND OF THE INVENTION

1. Field of the Invention

The present invention relates to a liquid crystal display device with a touch panel.

2. Description of the Related Art

A touch panel lapping over a display screen of an information communication terminal such as a computer, which has been used as an input device, has been widely used. Liquid crystal display devices that have been generally widespread as display devices are devices that change an orientation of a liquid crystal composition, which is sealed between two substrates of a thin film transistor substrate (hereinafter referred to as "TFT substrate") and a color filter substrate, according to a change in electric field, and control a transmission degree of light that passes through the liquid crystal composition to display an image. Among those devices, in an IPS (in plane switching) system in which both of pixel electrodes and a common electrode are arranged on a TFT substrate side, a so-called lateral electric field is developed to realize a display having a wide viewing angle.

The touch panel is an input device that recognizes a position on a panel touched with a user's finger to allow a processing unit to conduct processing. As the touch panels, there have been known a resistance film type that detects a change in a resistance value of a touched portion, an optical sensor type that detects a change in the amount of light of a portion shielded by touch, and a capacitive coupling type that detects a change in capacitance. The capacitive coupling type has been widely used from the viewpoints that a transmittance of a panel is high, and a display image quality is not deteriorated, and that there is no contact with another electrode, and the durability is high.

FIG. 11 illustrates a touch panel 800 using the capacitive type. The touch panel 800 includes a glass substrate 806, drive electrodes 802 that are formed on the glass substrate 806, and extend in a lateral direction, detection electrodes 801 that extend in a longitudinal direction, and a touch panel control unit 808 that applies a voltage to the drive electrode 802, and detects a voltage or a current from the detection electrode 801. FIG. 12 illustrates a cross-section of FIG. 11 taken along a line XII-XII. As illustrated in the figure, the drive electrode 802 and the detection electrode 801 are formed in the same layer, and an insulating film 809 is formed on that layer. Also, a transparent shield electrode 807 for shielding an electric field developed from the display device is formed on a lower side of the glass substrate 806. Cross portions of the drive electrodes 802 and the detection electrodes 801 are formed so that the drive electrodes 802 and the detection electrodes 801 intersect with each other in different layers via through-holes so as not to contact with each other. In detection, a voltage of a pulse waveform is applied to the drive electrodes 802 in sequence, and a response of the detection electrodes 801 is sensed to detect whether the touch panel 800 has been touched, or not.

In recent years, upon a request for downsizing and thinning of the information communication terminal, a thinner liquid crystal display device with a touch panel has been demanded. JP 2009-244958 A discloses a thinner liquid crystal display device with a touch panel in which a common electrode of the liquid crystal display device is used as a drive electrode of the touch panel in the liquid crystal display device of an IPS type.

SUMMARY OF THE INVENTION

FIG. 13 is a partially enlarged diagram illustrating a layout of a drive electrode 902 and a detection electrode 901 when a common electrode is used as the drive electrode of a touch panel. As illustrated in the figure, because the common electrode of the liquid crystal display device needs to be arranged on an entire surface of a display surface, an area of a cross portion (overlap portion) of the drive electrode 902 used as the common electrode with the detection electrode 901 is large, and a capacitance thereof is also increased. For that reason, when the drive electrode 902 functions as the drive electrode, because a transient current becomes large, a power consumption becomes large. Also, offset adjustment that a current in a non-detection state is subtracted from a current at the time of detection is required, thereby making it difficult to enhance the detection sensitivity.

The present invention has been made in view of the above circumstances, and aims at providing a display device with a touch panel having an electrode of the display device as a drive electrode of the touch panel, which suppresses a power consumption with higher sensitivity.

According to the present invention, there is provided a liquid crystal display device with a touch panel, including: pixel electrodes that are a plurality of electrodes arranged in respective pixels in a display area, and to which a electrical potential corresponding to a gradation value is applied; common electrodes that are a plurality of electrodes which extend in one direction so as to traverse the display area; detection electrodes that are a plurality of electrodes which extend in another direction different from the one direction so as to traverse the display area, and detect a touch position on the panel; and a liquid crystal layer having a liquid crystal composition whose orientation is changed according to an electric field developed by the pixel electrodes and the common electrodes, in which the common electrodes include a first electrode to which a detection potential for detecting the touch position on the panel is applied, and a second electrode to which a potential different from the detection potential is applied during a period in which the detection potential is applied.

Also, according to the present invention, in the liquid crystal display device with a touch panel, the first electrode includes a cross portion that crosses the detection electrode, and a detection portion which does not cross the detection electrode, and the cross portion can be made narrower in width than the detection portion.

Also, according to the present invention, in the liquid crystal display device with a touch panel, the second electrode may overlap with an area in which the first electrode does not overlap with the detection electrode.

DETAILED DESCRIPTION OF THE INVENTION

Figure 1:
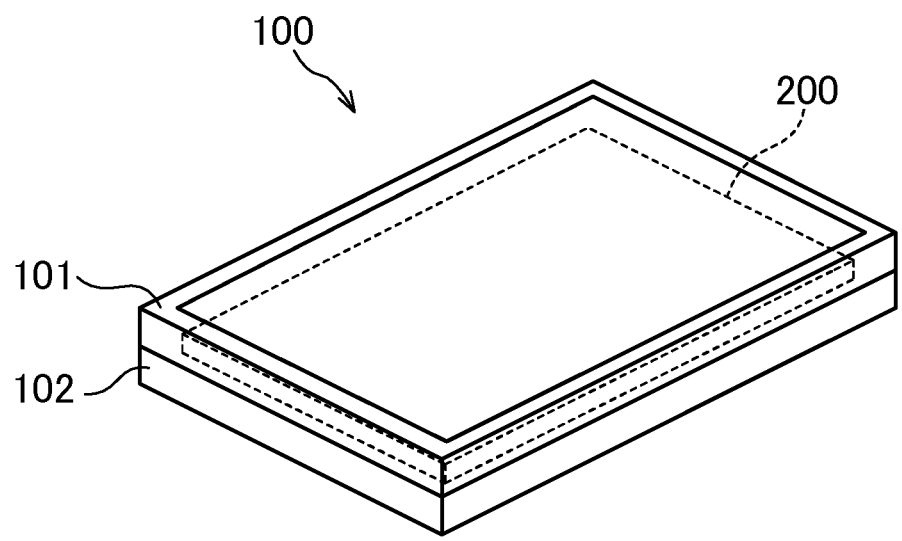
FIG. 1 is a diagram illustrating a liquid crystal display device with a touch panel according to a first embodiment of the present invention.

Hereinafter, embodiments of the present invention will be described with reference to the accompanying drawings. In the drawings, identical or equivalent elements are denoted by the same symbols, and a repetitive description will be omitted.

[First Embodiment]

FIG. 1 is a diagram illustrating a liquid crystal display device with a touch panel 100 according to a first embodiment of the present invention. As illustrated in the figure, the liquid crystal display device with a touch panel 100 includes a liquid crystal display panel with a touch panel 200, and an upper frame 101 and a lower frame 102 that fixedly sandwich the liquid crystal display panel with a touch panel 200 therebetween.

Figure 2:
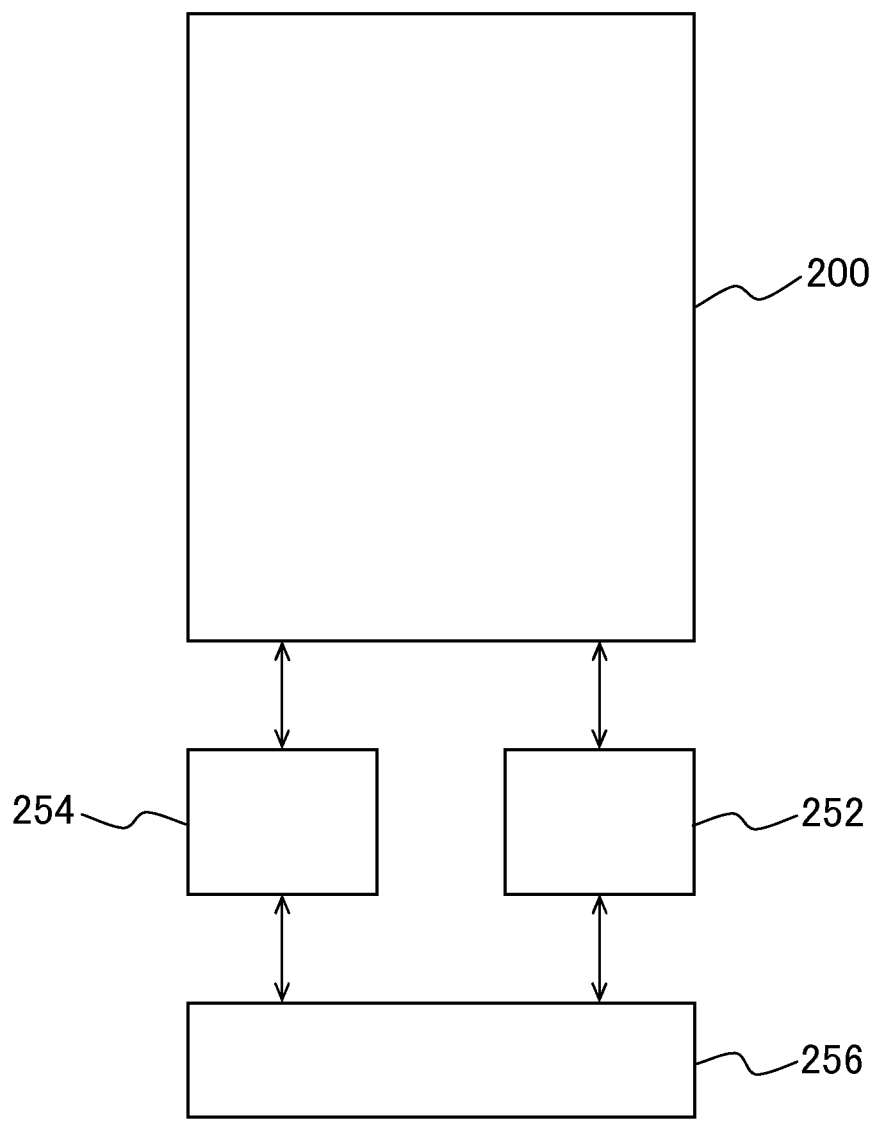
FIG. 2 is a block diagram illustrating a control configuration of the liquid crystal display panel with a touch panel in FIG. 1.

FIG. 2 is a block diagram illustrating a control configuration of the liquid crystal display panel with a touch panel 200 in FIG. 1. As illustrated in the figure, the liquid crystal display panel with a touch panel 200 is controlled by a display control unit 252 that controls a liquid crystal display function for conducting screen display, a touch panel control unit 254 that controls a touch panel function for detecting a touch position on a screen, and a system control unit 256 that integratively controls the display control unit 252 and the touch panel control unit 254.

Figure 3:
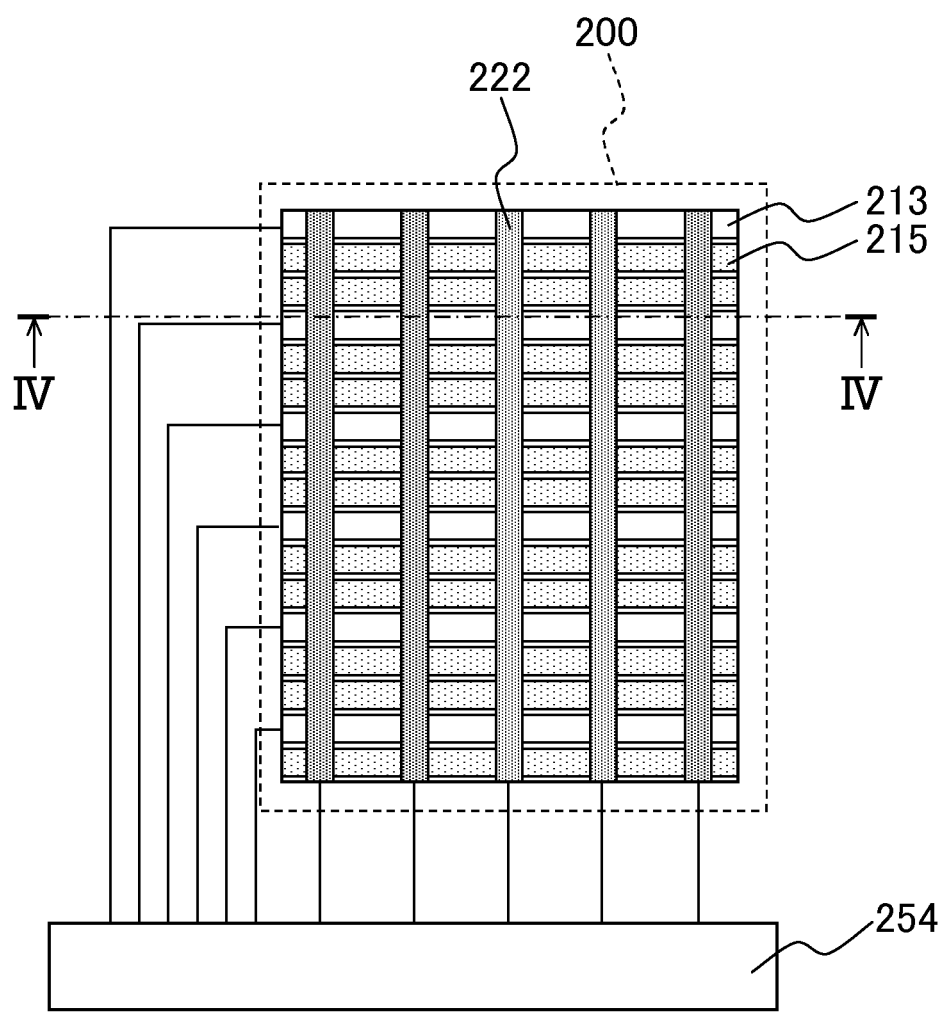
FIG. 3 is a diagram illustrating a layout of electrodes controlled by a touch panel control unit in FIG. 2.

FIG. 3 is a diagram illustrating a layout of electrodes controlled by the touch panel control unit 254 in FIG. 2. The common electrodes used for liquid crystal display are arranged to cover an entire surface of a display area. In order to allow a part of the common electrodes to also function as drive electrodes of the touch panel function, first electrodes 213 and second electrodes 215 each having a strip configuration which extend in a lateral direction of the display area are arranged to spread all over the display area as the common electrodes. Also, because the first electrodes 213 function as the drive electrodes of the touch panel function, a voltage is applied from the touch panel control unit 254 to the first electrodes 213. On the other hand, detection electrodes 222 each have a strip configuration extending in a longitudinal direction, and a plurality of the detection electrodes 222 are arranged in parallel in the lateral direction of the display area, and a signal detected by the detection electrodes 222 is input to the touch panel control unit 254. In this embodiment, two of the second electrodes 215 are arranged between the adjacent first electrodes 213, and those two juxtaposed second electrodes 215 may be integrated into one piece, or three or more second electrodes 215 may be juxtaposed.

Figure 4:
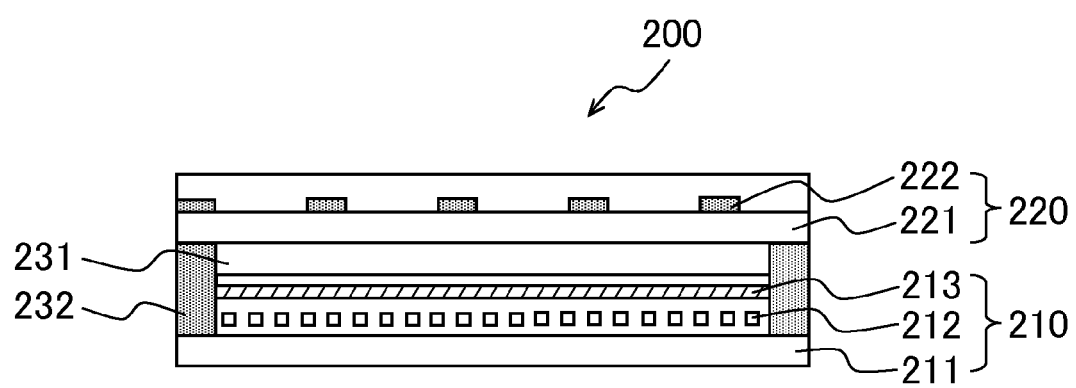
FIG. 4 is a cross-sectional view taken along a line IV-IV in FIG. 3.

FIG. 4 is a schematic cross-sectional view taken along a line IV-IV in FIG. 3. As illustrated in the figure, the liquid crystal display panel with a touch panel 200 includes a TFT substrate 210 in which thin film transistors (TFT: thin film transistor) not shown are formed, and a circuit for controlling an orientation of liquid crystal is formed for each pixel, a color filter substrate 220 that outputs an input light as a light having a wavelength of each color of RGB by color filters not shown for each pixel, and a liquid crystal layer 231 having a liquid crystal composition sealed by a seal material 232 between those substrates.

In this example, as illustrated in FIG. 4, the TFT substrate 210 is formed with pixel electrodes 212, and the first electrodes 213 and the second electrodes 215 which function as the common electrodes in the liquid crystal display on a glass substrate 211. The color filter substrate 220 is formed with detection electrodes 222 on a glass substrate 221.

Figure 5:
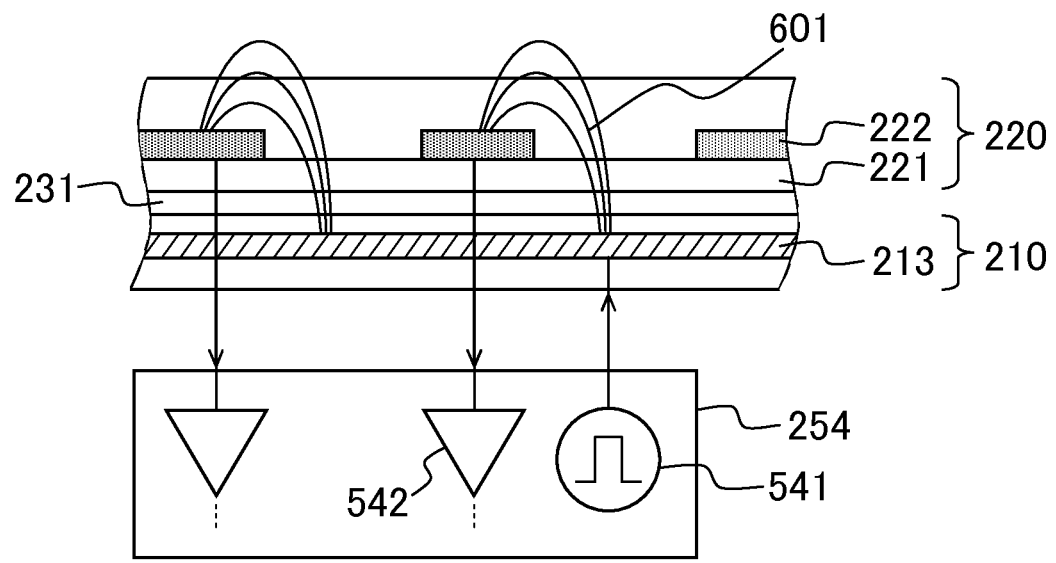
FIG. 5 is a diagram illustrating an appearance of an electric field when a screen is not touched.
Figure 6:
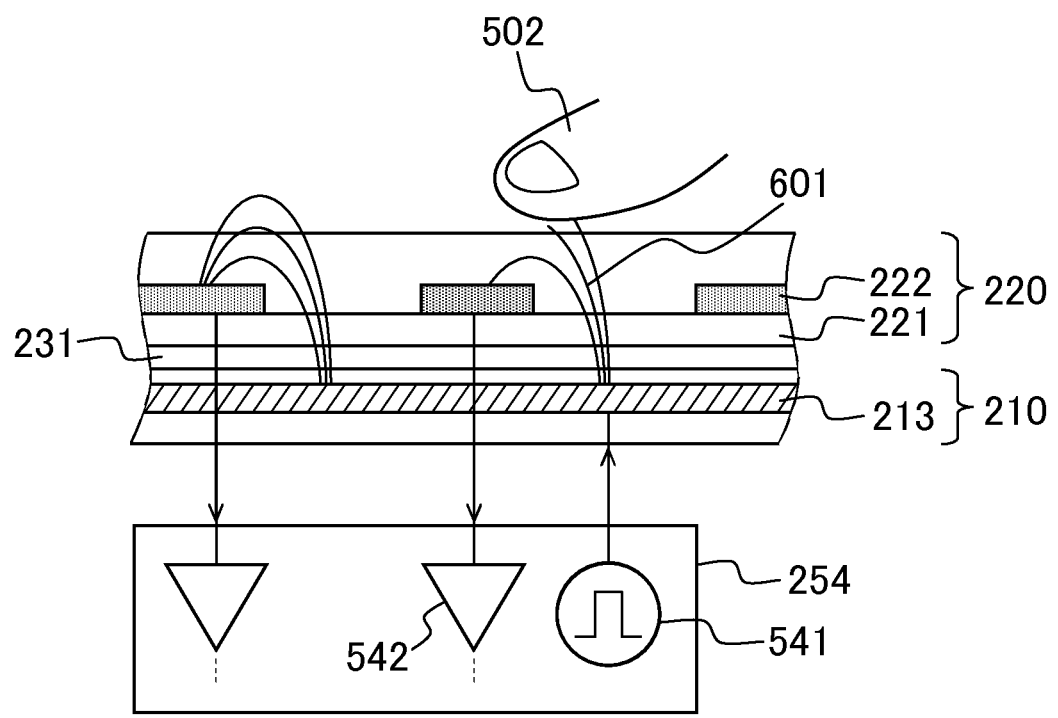
FIG. 6 is a diagram illustrating an appearance of an electric field when the screen is touched.
Figure 7:
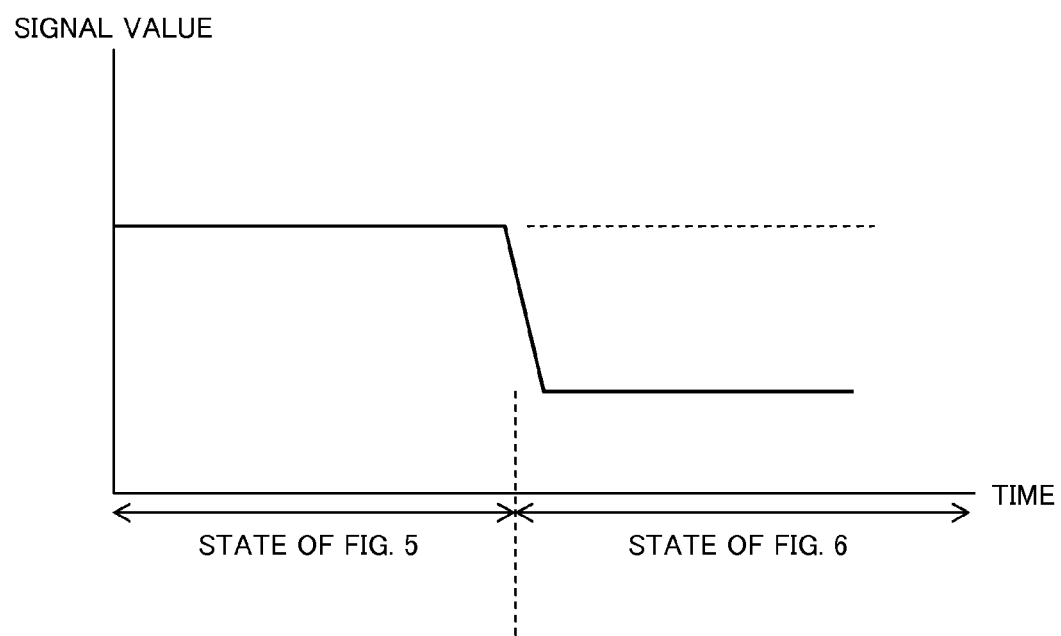
FIG. 7 is a graph illustrating an appearance of a change in a detection signal.

Subsequently, a description will be given of a detection principle of the liquid crystal display panel with a touch panel 200 according to the present invention. FIG. 5 is a diagram illustrating an appearance of an electric field when the screen is not touched with a finger. As illustrated in the figure, a pulse signal 541 is input to each first electrode 213 from the touch panel control unit 254 at given time intervals, and a resultant electric field causes a current to transiently flow into the detection electrodes 222. The current is measured by a detector circuit 542 within the touch panel control unit 254 for each of the detection electrodes 222. FIG. 6 illustrates an appearance of the electric field when the screen is touched with a finger 502. As illustrated in the figure, when the screen is touched, the electric field is shielded, the transient current flowing into the detection electrode 222 decreases, and a signal level in the corresponding detector circuit 542 is changed. Therefore, the touch panel control unit 254 can detect the touch. FIG. 7 is a graph illustrating an appearance of a change in a detection signal in a state where the screen is not touched in FIG. 5, and in a state where the screen is touched in FIG. 6. The detector circuit 542 may detect a current, or may be detect a voltage.

Figure 8:
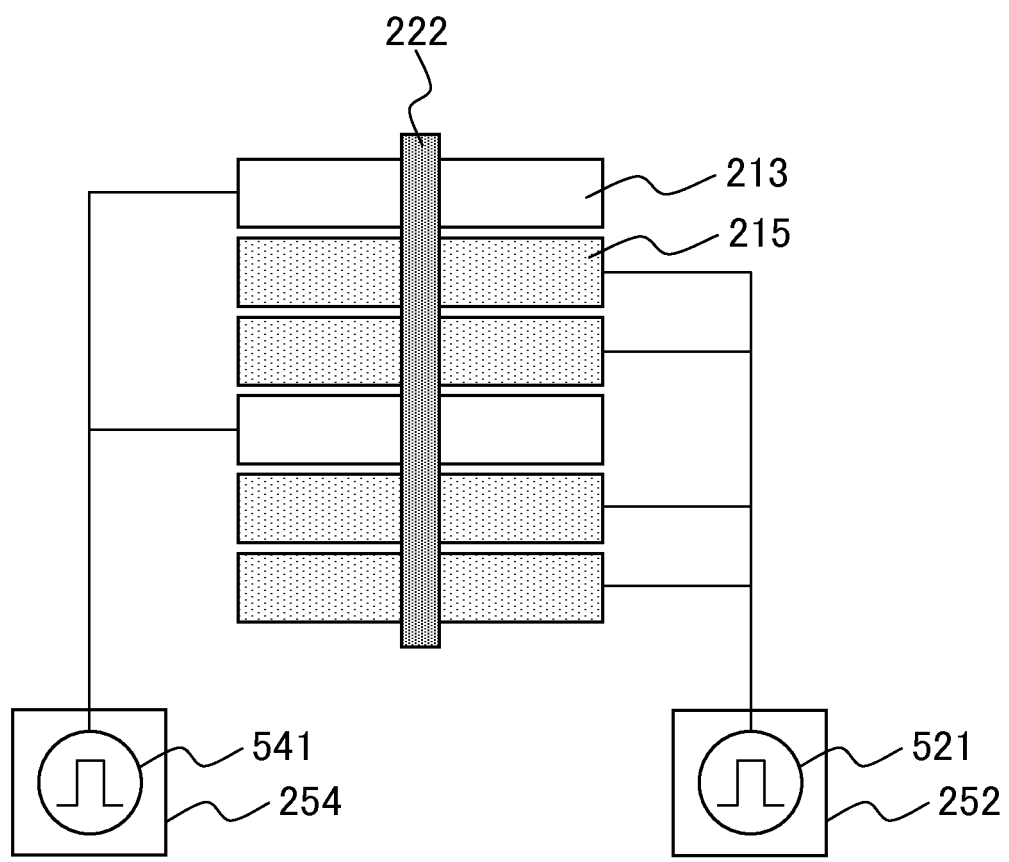
FIG. 8 is a partially enlarged diagram illustrating a layout of first electrodes, second electrodes, and a detection electrode according to the first embodiment.

FIG. 8 is a partially enlarged diagram illustrating a layout of the first electrodes 213, the second electrodes 215, and the detection electrode 222. As illustrated in the figure, in this embodiment, an area where the first electrodes 213 and the detection electrodes 222, which function as the drive electrodes, cross each other can be reduced. Therefore, the transient current can be reduced, the power consumption can be suppressed, and an offset current in the state where the screen is not touched is reduced. As a result, the detection can be conducted with higher sensitivity.

In this example, as described above, the first electrodes 213 and the second electrodes 215 function as the common electrodes in the liquid crystal display. However, the detection is conducted when the pixel electrodes 212 are floating after a voltage based on a gradation value is applied to the pixel electrodes 212. Therefore, potential differences between each of the first electrodes 213 and the second electrodes 215, and the pixel electrodes 212 are kept even if the potentials of the first electrodes 213 and the second electrodes 215 are changed, and in principle do not affect the image quality. However, when a potential difference between the first electrodes 213 and the second electrodes 215 is large, it is conceivable that the potential differential affects the electric field of the liquid crystal layer. Therefore, a potential for holding the image quality is also applied to the second electrodes 215. If the above potential is different from that of the first electrodes 213, the potential may be applied at the same timing or a different timing. For example, the transient current can be reduced by application of a potential smaller in absolute value than that of the first electrodes 213. In this embodiment, as illustrated in FIG. 8, a pulse signal 521 is applied from the display control unit 252. Alternatively, the pulse signal 521 may be applied from the touch panel control unit 254.

[Second Embodiment]

Figure 9:
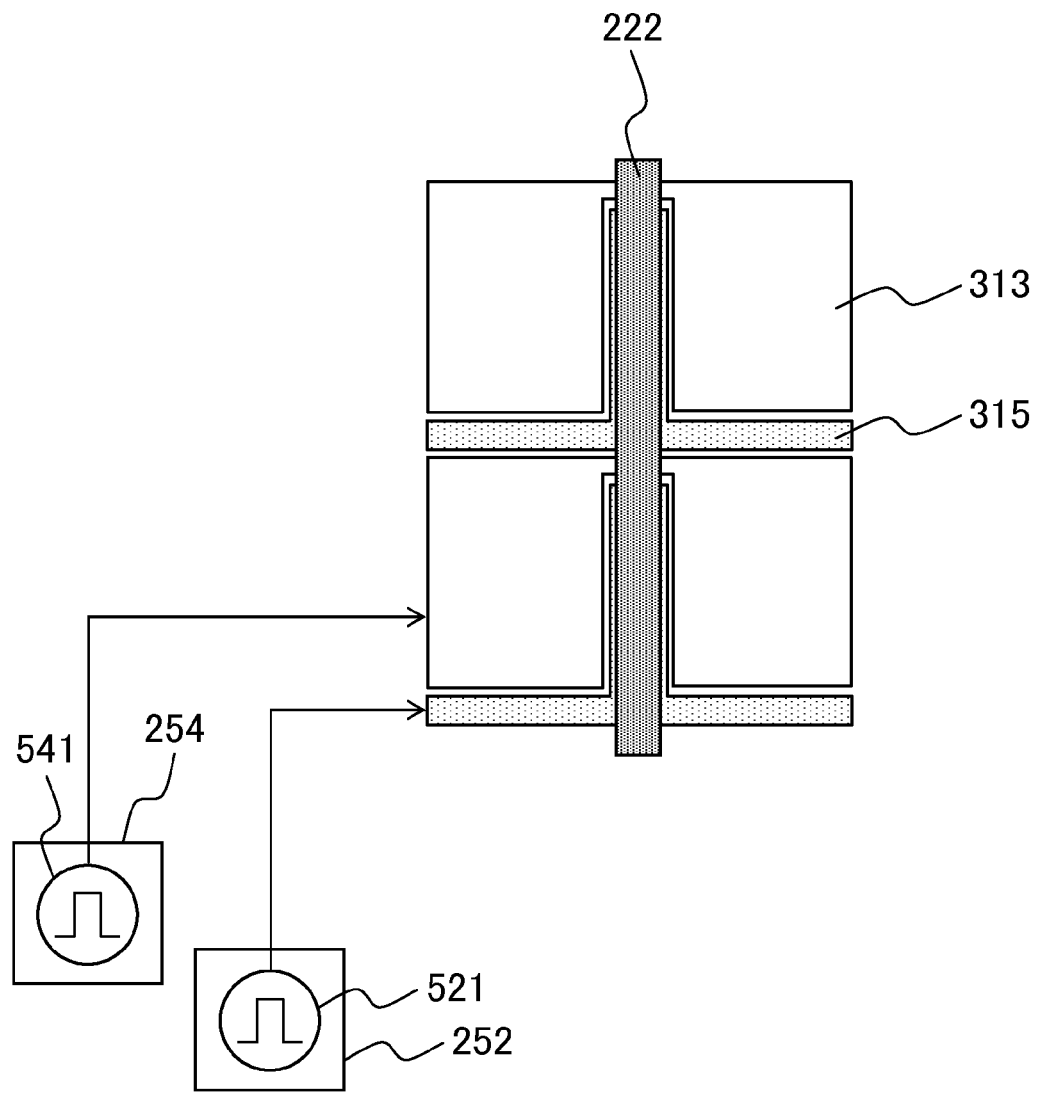
FIG. 9 is a partially enlarged diagram illustrating a layout of first electrodes, second electrodes, and a detection electrode according to a second embodiment.

FIG. 9 is a partially enlarged diagram illustrating a layout of a first electrode 313, a second electrode 315, and the detection electrode 222 in a liquid crystal display device with a touch panel according to a second embodiment. As illustrated in the figure, in the second embodiment, the configurations of the first electrodes and the second electrodes are different from those in the first embodiment. The first electrode 313 is thinned in only a portion that crosses the detection electrode 222, and has a wide area in other portions. With the above configuration, because an area of the cross portion of the first electrode 313 and the detection electrode 222 is small, the transient current when the pulse signal 541 is applied is reduced, and the power consumption can be suppressed. Also, the high-sensitivity detection can be conducted since the offset current becomes small. Further, because the wide area is provided in the portion other than the cross portion, the potential difference between the first electrode 313 and the pixel electrode is held in the wide area, and the image quality can be maintained. The second electrode 315 is shaped to be embedded in a gap portion caused by the shape of the first electrode 313, and the pulse signal 521 is applied to the second electrode 315 as in the first embodiment.

[Third Embodiment]

Figure 10:
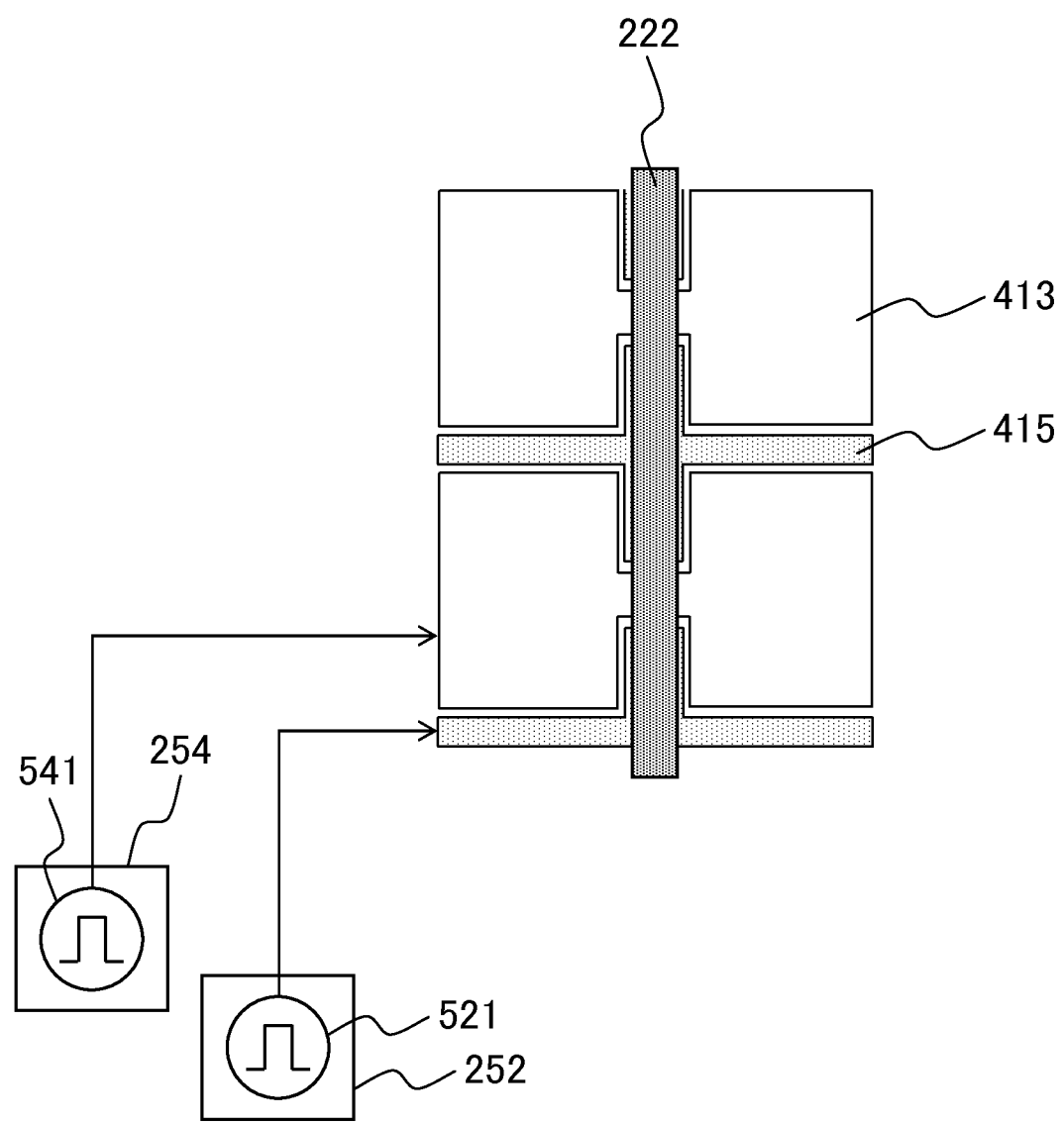
FIG. 10 is a partially enlarged diagram illustrating a layout of first electrodes, second electrodes, and a detection electrode according to a third embodiment.
Figure 11:
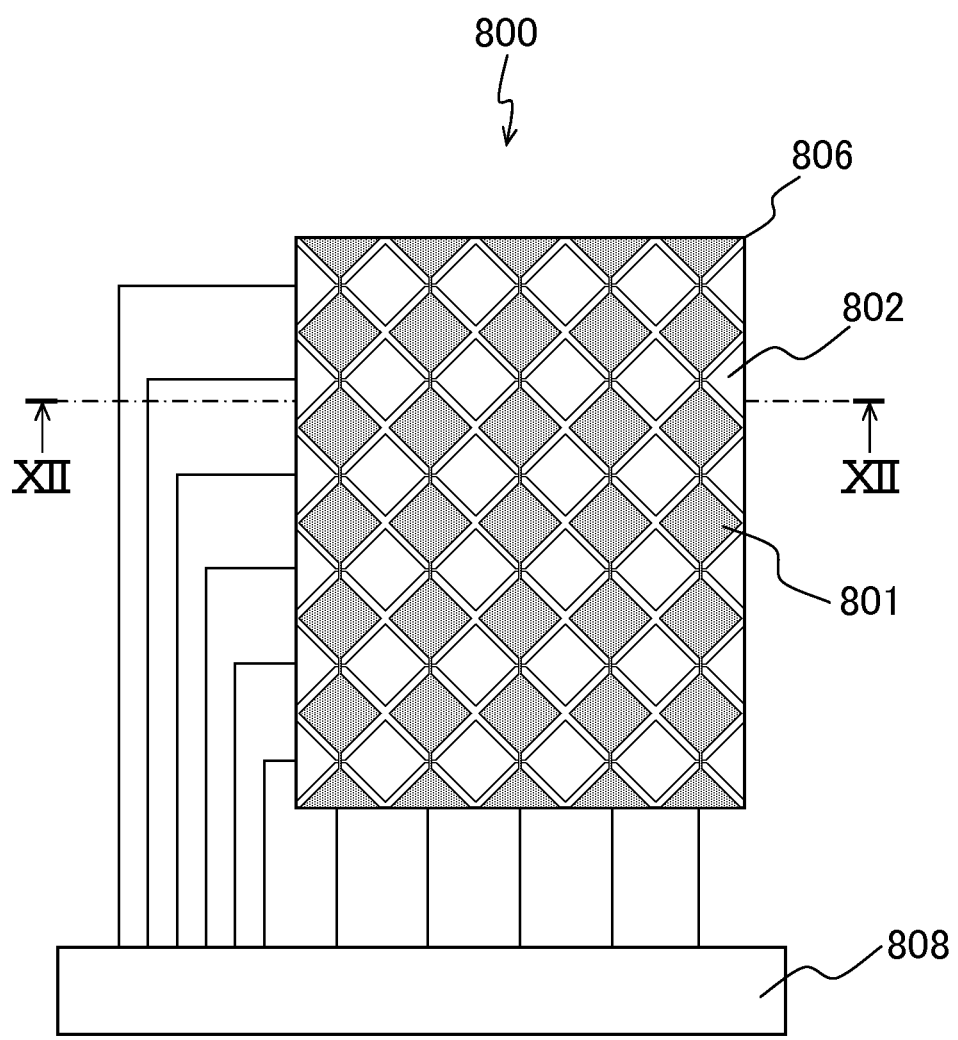
FIG. 11 is a diagram illustrating the touch panel using a capacitive type.
Figure 12:
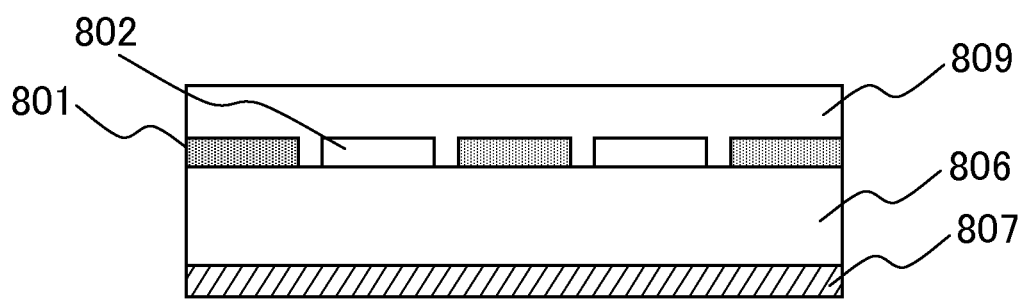
FIG. 12 is a cross-sectional view taken along a line XII-XII in FIG. 11.
Figure 13:
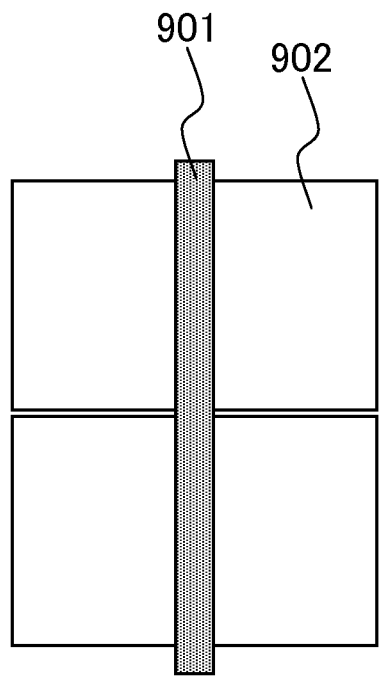
FIG. 13 is a partially enlarged diagram illustrating a layout of drive electrodes and a detection electrode when common electrodes are used as drive electrodes of the touch panel in a related art.

FIG. 10 is a partially enlarged diagram illustrating a layout of a first electrode 413, a second electrode 415, and the detection electrode 222 in a liquid crystal display device with a touch panel according to a third embodiment. As illustrated in the figure, in the third embodiment, a position of the first electrode 413 that crosses the detection electrode 222 is different from that in the second embodiment. Even with this configuration, because the first electrode 413 is thinned in only a portion that crosses the detection electrode 222, an area of the cross portion of the first electrode 413 and the detection electrode 222 is small, the transient current when the pulse signal 541 is applied is reduced, and the power consumption can be suppressed. Also, the high-sensitivity detection can be conducted since the offset current becomes small. Further, because the wide area is provided in the portion other than the cross portion, the potential difference between the first electrode 413 and the pixel electrode is held in the wide area, and the image quality can be maintained. The second electrode 415 is shaped to be embedded in a gap portion caused by the shape of the first electrode 413, and the pulse signal 521 is applied to the second electrode 415 as in the first embodiment.

As has been described above, according to the above-mentioned respective embodiments, the power consumption can be suppressed with higher sensitivity in the display device with a touch panel having the electrode of the display device as the drive electrode of the touch panel.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device with a touch panel, comprising:
   pixel electrodes that are a plurality of electrodes arranged in respective pixels in a display area, and to each of which an electrical potential corresponding to a gradation value is applied;
   common electrodes that are a plurality of electrodes which extend in one direction so as to traverse the display area, the common electrodes including a first electrode and a second electrode;
   detection electrodes that are a plurality of electrodes which extend in another direction different from the one direction so as to traverse the display area, and detect a touch position on the touch panel; and
   a liquid crystal layer having a liquid crystal composition whose orientation is changed according to an electric field developed by the pixel electrodes with the first electrode and the second electrode of the common electrodes,
   wherein a detection signal for detecting the touch position on the touch panel is applied to the first electrode of the common electrodes, and a potential different from the detection signal is applied to the second electrode during a period in which the detection signal is applied, without application of the detection signal to the second electrode.

2. The liquid crystal display device with a touch panel according to claim 1,
   wherein the first electrode includes a multi-level cross portion that crosses the detection electrode, and a detection portion which does not cross the detection electrode with grade separation, and
   wherein the multi-level cross portion is narrower in width than the detection portion.

3. The liquid crystal display device with a touch panel according to claim 1,
   wherein the second electrode overlaps with an area in which the first electrode does not overlap with the detection electrode.

4. The liquid crystal display device with a touch panel according to claim 1, wherein
   the first electrode includes first multi-level cross portions that cross the detection electrodes,
   the second electrode includes second multi-level cross portions that cross the detection electrodes,
   the first multi-level cross portions are smaller in width than the second multi-level cross portions.

* * * * *